March 14, 1939.  M. WINANDY  2,150,257
GREENHOUSE BENCH
Filed Feb. 1, 1938
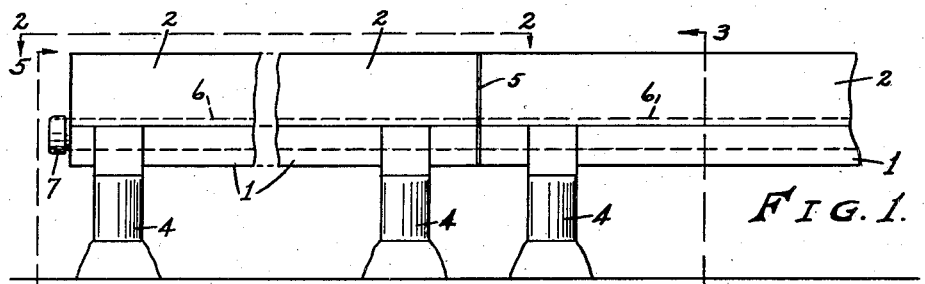
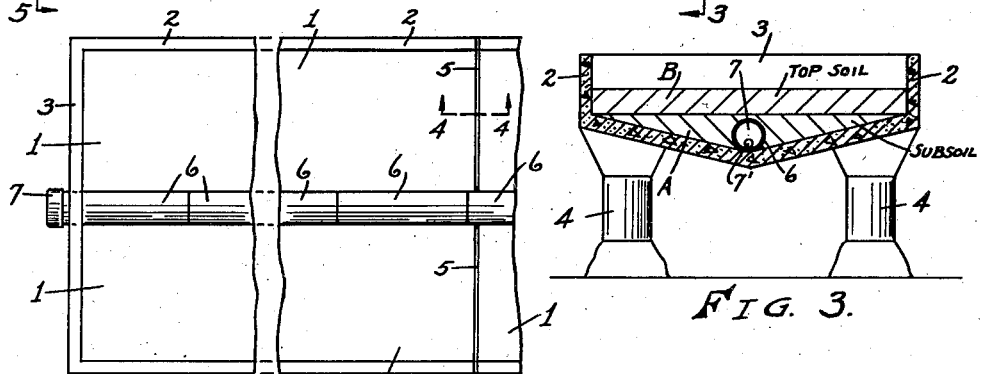
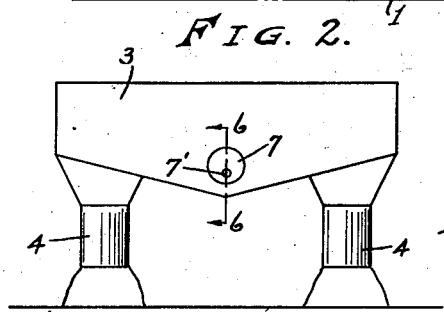
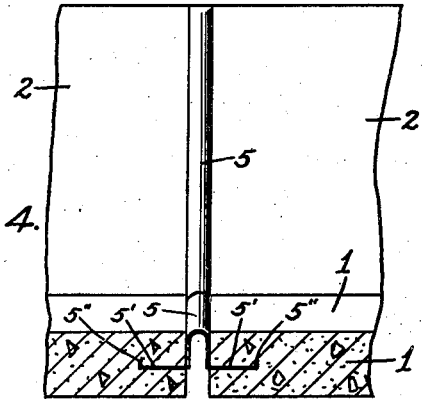
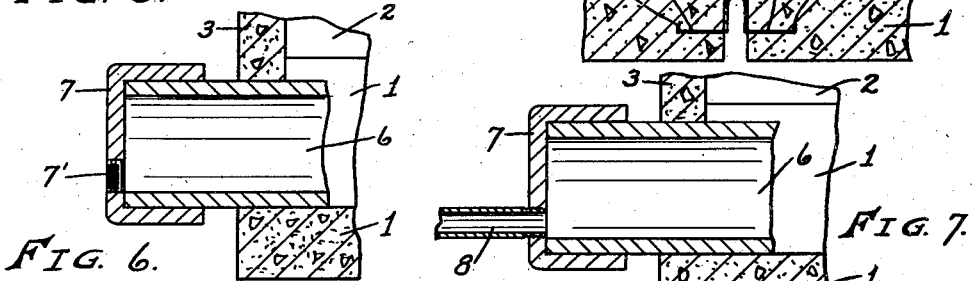
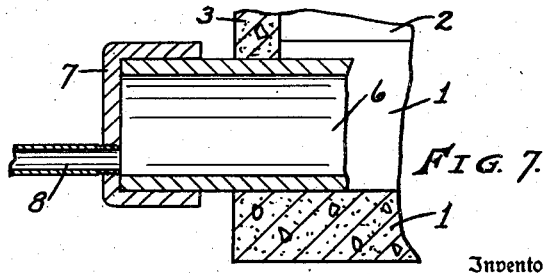
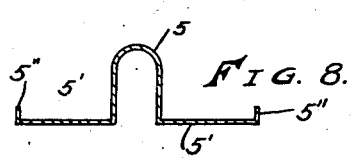
Inventor,
MIKE WINANDY;
By
Donald E. Windle.
Attorney Patented Mar. 14, 1939

2,150,257

UNITED STATES PATENT OFFICE 2,150,257

GREENHOUSE BENCH

Mike Winandy, Richmond, Ind.

Application February 1, 1938, Serial No. 188,045

6 Claims. (Cl. 47—18)

My present invention relates to benches which are used in greenhouses and the like for growing plants and flowers, and the principal object of the invention is the provision of benches formed of concrete construction which are substantial, and which provide a new and novel manner of draining excess moisture from the earth with which the benches are filled or partially filled.

Another object of the invention is the provision of a means for subsoil irrigation and thereby providing a proper amount of moisture to the roots of growing plants.

A further object of the invention is the provision of a means for the sterilization of soil within the benches, and thereby destroying harmful insects with which the soil might become infested.

A still further object of the invention is the provision of a substantial bench in which positive drainage is effected due to the novel form of the bottom or floor of the bench.

Other objects and advantages of the invention will suggest themselves in the course of the following description, and that which is new will be pointed out in the appended claims.

The most satisfactory manner of carrying out the principles of the invention in a practical, economical, and efficient manner is shown in the accompanying one sheet of drawings, in which;

Figure 1 is a partial side elevation of a bench, the same being constructed to illustrate the embodiment of the principles of the invention.

Figure 2 is a partial top plan view of the bench, taken from line 2—2 of Figure 1.

Figure 3 is a detail cross section taken through the bench on line 3—3 of Figure 1, showing the drainage members positioned therein, and with subsoil and top soil being shown therein.

Figure 4 is a detail section taken on line 4—4 of Figure 2 showing one of the expansion joint members used in connection therewith.

Figure 5 is an end elevation of the bench taken from line 5—5 of Figure 1, and showing the extended portion of the drainage members together with the cap member therefor.

Figure 6 is a detail vertical section taken on line 6—6 of Figure 5 through the end portion of the drainage members and showing the cap member positioned thereon, and showing a threaded aperture formed through the cap member.

Figure 7 is a detail section similar to that shown in Figure 6 but with the same showing a conduit providing for the introduction of water or steam into the drainage members.

Figure 8 is a detail cross section taken through one of the expansion joint members.

Like characters designate like parts throughout the several views.

In order that the construction, the advantages, and the utilization of the invention may be more fully understood and appreciated, I will now take up a detailed description thereof, in which the same will be set forth more completely.

In the drawing, 1 designates the bottom of the bench which is formed in a modified V shape in cross section, with the central portion of the bottom 1 being the lowest point thereof. Vertically extending side wall members 2 are formed at the outer edges of the bottom, with end members 3 being formed between the end portions of the side members 2. The benches are supported by means of the leg members 4 which are also formed of concrete. All of the members 1, 2, 3, and 4 are formed integral with each other and provide a substantial bench.

The letters A and B, shown in Figure 3 designate subsoil and top soil respectively.

In the length of extremely long benches, it is necessary to provide for expansion and contraction. In order to provide suitable joints in the length of the benches, the expansion joint members 5 are used, the same being preferably formed of copper sheet metal formed in a channel shape with the flanges 5' being turned outwardly and thence upwardly and forming the portions 5'', with the upwardly turned portions 5'' forming an anchorage in the concrete construction of the benches.

Drainage of excess moisture from the benches is provided by means of a conduit comprised of a plurality of sections of tile 6, the walls of which are permeable to moisture. The tile are placed end to end longitudinally of the benches with a short space being formed between the ends of the adjacent tiles, and are positioned in the center of the bottom of the benches with the modified V shape of the bottom member maintaining the tile 6 in predetermined position with relation to the side members 2. An end portion of one of the drainage members 6 is extended outwardly through an aperture formed in the end member 3 of the bench, with a cap member 7 being secured over the extended end portion thereof. A threaded aperture 7' is formed through the cap member 7 and provides a means for draining moisture from the members 6.

When it is desired to irrigate the subsoil, a conduit 8 is threaded into the threaded aperture, and water is forced therefrom into the tile 6 and permeates through the walls thereof and through the spaces formed between the ends of adjacent tiles, and into the subsoil.

At frequent intervals, it is necessary to sterilize the soil in the benches in order to destroy insects with which the soil becomes infested. In order to accomplish the proper sterilization of the soil, live steam is supplied, through the conduit 8 to the members 6. The live steam, being under pressure, is forced to permeate the walls of the members 6 and the spaces formed between the ends of the adjacent members 6, and penetrates the soil in the benches.

It will be apparent that, by the arrangement of the members 6, the same being located centrally with relation to the width of the benches, and forming an efficient means for draining excess moisture from the soil. The bottoms of the benches, being formed as shown in Figure 3, provide for drainage of moisture from the entire surface of the soil to the central longitudinal portion of the bottom members 1, where the moisture is certain to permeate the walls of the members 6 and the spaces formed therebetween, and be drained therefrom through the aperture 7'. It will also be apparent the soil may be thoroughly sterilized by the introduction of live steam, under pressure, into the members 6, after which the steam is forced through the walls of the members 6 and the spaces formed therebetween, and into the soil.

The opposite end portion of the series of members 6 may be placed tightly against the opposite end of the bench, or may be extended therethrough with a cap member being secured thereon. The second cap member may be solid without an aperture 7' being formed therethrough.

It is obvious that there must be a slight incline in the elevation of the bottom of the bench from one end to the opposite end thereof in order to provide proper drainage of moisture from the members 6 to the cap member 7.

It is to be understood that I am not to be limited to the exact arrangements of the parts herein shown and described, but that minor changes may be made therein insofar as the changes may fall within the scope of the appended claims.

Having now fully shown and described my invention, what I claim, and desire to secure by Letters Patent of the United States, is:

1. In a greenhouse bench having side members and end members, a bottom member formed V-shaped longitudinally of the bench with the lowermost portion of the V being centrally located and in parallel relation with the side members and providing drainage to the lateral center of the bench and with the upper and lower surfaces of the bottom member being parallel with each other.

2. A greenhouse bench having side, end, and bottom members, with the bottom being formed V-shaped in cross section, a series of removable permeable drainage members positioned in the lowermost portion of the V with the end portion of the series of drainage members extending outwardly through an end member of the bench.

3. A greenhouse bench formed of side and end members and having a V-shaped bottom formed in connection therewith, a series of removable permeable tile drainage members positioned end to end and extending longitudinally of the bench with one end of the series of drainage members extending through and projecting beyond an end member of the bench with a cap member secured over the projecting end of the drainage member and with an aperture formed through the cap member providing an outlet for drainage of the permeable members through the cap member.

4. In a greenhouse bench having a V-shaped bottom formed therein, means providing subsoil irrigation, said means comprising a series of permeable tile members positioned end to end to each other with a space formed therebetween and extending longitudinally of the bench with one end of the series projecting through an end of the bench with a cap member being secured over the projecting end portion thereof, and a conduit secured in the cap member and providing for the introduction of water into the bench through the permeable members.

5. In a greenhouse bench having a V-shaped bottom formed therein and adapted to be filled with soil and with the bottom thereof forming an unbroken V shape, means for sterilizing the soil within the bench, said means comprising a plurality of removable permeable members positioned longitudinally with relation to the sides of the bench and extending outwardly through an end member of the bench, a cap member secured on the projecting end portion of the outwardly extending permeable members, and an aperture formed in the cap member and providing means for forcing live steam through the permeable members and thence into the soil.

6. A greenhouse bench having a V-shaped bottom formed therein, permeable conduits having spaces formed at the ends thereof and extending longitudinally of the bench and being positioned in the lowermost portion of the V shape and with one end of one of the permeable conduits extending through and projecting beyond the end of the bench, with the conduit forming a drain for excess moisture within the bench and also forming a means through which soil within the bench is irrigated, and with the same conduits together forming a conductor through which soil may be sterilized within the bench.

MIKE WINANDY.